(12) United States Patent
Rusert et al.

(10) Patent No.: US 10,944,994 B2
(45) Date of Patent: Mar. 9, 2021

(54) INDICATING BIT STREAM SUBSETS

(75) Inventors: Thomas Rusert, Kista (SE); Per Fröjdh, Stockholm (SE); Zhuangfei Wu, Danderyd (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 1899 days.

(21) Appl. No.: 14/129,156

(22) PCT Filed: Jun. 20, 2012

(86) PCT No.: PCT/SE2012/050685
§ 371 (c)(1),
(2), (4) Date: Dec. 24, 2013

(87) PCT Pub. No.: WO2013/002709
PCT Pub. Date: Jan. 3, 2013

(65) Prior Publication Data
US 2014/0126652 A1    May 8, 2014

Related U.S. Application Data

(60) Provisional application No. 61/503,118, filed on Jun. 30, 2011.

(51) Int. Cl.
*H04N 19/70* (2014.01)
*H04N 21/845* (2011.01)
(Continued)

(52) U.S. Cl.
CPC ............ *H04N 19/70* (2014.11); *H04N 19/33* (2014.11); *H04N 19/597* (2014.11); *H04N 19/85* (2014.11); *H04N 21/8451* (2013.01)

(58) Field of Classification Search
None
See application file for complete search history.

(56) References Cited

U.S. PATENT DOCUMENTS

| 7,603,024 B1* | 10/2009 | Chun | ........ H04N 21/434 375/240.01 |
| 2005/0123055 A1* | 6/2005 | Winger | ........ H04N 19/44 375/240.25 |

(Continued)

OTHER PUBLICATIONS

S. Wenger, Y. K. Wang and T. Schierl, "Transport and Signaling of SVC in IP Networks," in IEEE Transactions on Circuits and Systems for Video Technology, vol. 17, No. 9, pp. 1164-1173, Sep. 2007. doi: 10.1109/TCSVT.2007.905523.*

(Continued)

*Primary Examiner* — Jayanti K Patel
*Assistant Examiner* — Stefan Gadomski
(74) *Attorney, Agent, or Firm* — Murphy, Bilak & Homiller, PLLC

(57) ABSTRACT

In one aspect, a compressed video bit stream is received and divided into packets that comprise either video data or supplemental information. Each packet is marked with a first subset identifier associated with a corresponding bit stream subset. A first sequence parameter set (SPS) is marked with the same first subset identifier as its associated bit stream subset. The first SPS comprises a second subset identifier indicating a decoding dependency of the bit stream subset associated with the first subset identifier on a bit stream subset associated with the second subset identifier. In another aspect, the packets from the bit stream are received and the first SPS is extracted. The first and second subset identifiers are used as relevant subset identifiers, and for each received packet, the first subset identifier is inspected and the packet is extracted when the first subset identifier matches one of the relevant subset identifiers.

4 Claims, 5 Drawing Sheets

(51) Int. Cl.
  *H04N 19/85* (2014.01)
  *H04N 19/597* (2014.01)
  *H04N 19/33* (2014.01)

(56) References Cited

U.S. PATENT DOCUMENTS

| | | | | |
|---|---|---|---|---|
| 2006/0056705 A1* | 3/2006 | Kadono | ............... | H04N 19/46 |
| | | | | 382/232 |
| 2006/0146734 A1* | 7/2006 | Wenger | ............ | H04L 29/06027 |
| | | | | 370/260 |
| 2007/0230564 A1* | 10/2007 | Chen | ............. | H04N 21/234327 |
| | | | | 375/240.01 |
| 2009/0003431 A1* | 1/2009 | Zhu | ............... | H04N 21/234327 |
| | | | | 375/240.01 |
| 2009/0010332 A1* | 1/2009 | Jeon | ..................... | H04N 19/105 |
| | | | | 375/240.12 |
| 2009/0034626 A1* | 2/2009 | Park | ...................... | H04N 19/70 |
| | | | | 375/240.25 |
| 2009/0141809 A1* | 6/2009 | Visharam | ............... | H04N 19/61 |
| | | | | 375/240.25 |
| 2010/0020884 A1* | 1/2010 | Pandit | ................. | H04N 19/597 |
| | | | | 375/240.25 |
| 2010/0111183 A1* | 5/2010 | Jeon | ..................... | H04N 19/597 |
| | | | | 375/240.16 |
| 2010/0195738 A1* | 8/2010 | Zhu | ............... | H04N 21/234327 |
| | | | | 375/240.25 |
| 2011/0064146 A1* | 3/2011 | Chen | ............. | H04N 21/234327 |
| | | | | 375/240.26 |
| 2011/0255796 A1* | 10/2011 | Nakamura | ............ | H04N 19/70 |
| | | | | 382/232 |
| 2012/0044322 A1* | 2/2012 | Tian | ..................... | H04N 19/597 |
| | | | | 348/43 |
| 2012/0183077 A1* | 7/2012 | Hong | .................... | H04N 19/70 |
| | | | | 375/240.25 |
| 2012/0269276 A1* | 10/2012 | Hong | .................... | H04N 19/70 |
| | | | | 375/240.25 |
| 2012/0275517 A1* | 11/2012 | Boyce | ................... | H04N 19/30 |
| | | | | 375/240.12 |
| 2013/0016776 A1* | 1/2013 | Boyce | ................... | H04N 19/30 |
| | | | | 375/240.06 |
| 2013/0188708 A1* | 7/2013 | Rusert | ................... | H04N 19/50 |
| | | | | 375/240.12 |
| 2013/0263201 A1* | 10/2013 | Chung-How | ......... | H04N 19/89 |
| | | | | 725/116 |
| 2013/0271571 A1* | 10/2013 | Wu | ...................... | H04N 13/161 |
| | | | | 348/43 |
| 2014/0072058 A1* | 3/2014 | Zu | ......................... | H04N 19/44 |
| | | | | 375/240.25 |

OTHER PUBLICATIONS

Wang et al. "System and Transport Interface of SVC" IEEE Transactions on Circuits and Systems for Video Technology, vol. 17, No. 9, Sep. 2007.*
Amon et al. "File Format for Scalable Video Coding", IEEE Transactions on Circuits and Systems for Video Technology, vol. 17, No. 9, Sep. 2007.*
Wenger et al. "Transport and Signaling of SVC in IP networks", IEEE Transactions on Circuits and Systems for Video Technology, vol. 17, No. 9, Sep. 2007.*
Rusert, Thomas et al. "High Level Syntax for Scalability Support in HEVC." Joint Collaborative Team on Video Coding of ITU-T SG16 WP3 and ISO/IEC JTC1/SC29/WG11, Document: JCTVC-F491, WG11No. M20921, Jul. 2011.
Sjöberg, Rickard et al. "NAL Unit Header Concept with Support for Bit Stream Scalability." Joint Collaborative Team on Video Coding of ITU-T SG16 WP3 and ISO/IEC JTC1/SC29/WG11, Document: JCTVC-E422, WG11 No. m19961, Geneva, Switzerland, Mar. 16-23, 2011.

* cited by examiner

Fig. 4
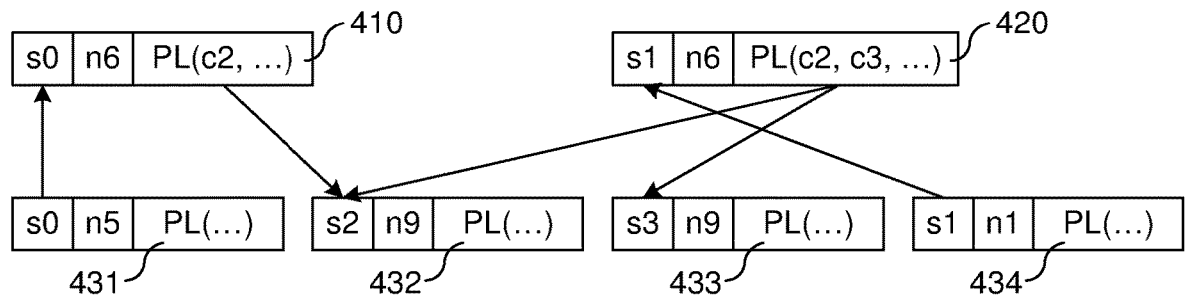
Fig. 5
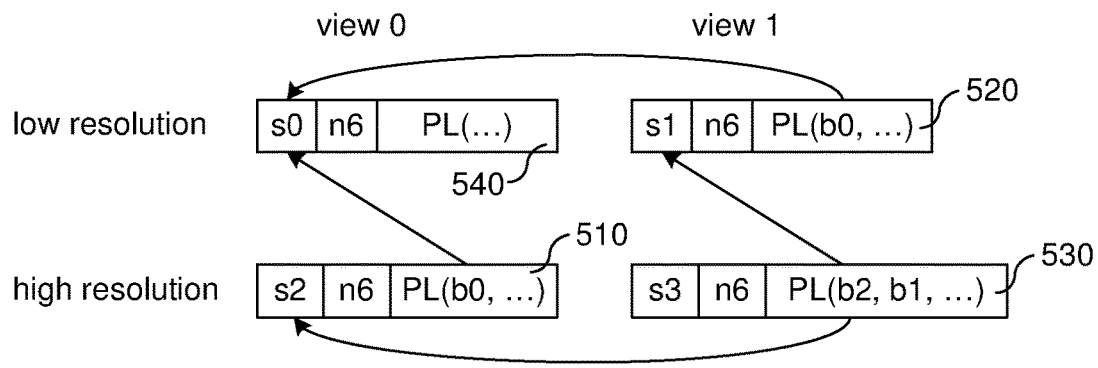
Fig. 6
```
forbidden_zero_bit (1 bit)
nal_ref_idc (2 bits)
nal_type (5 bits)
sps_id (16 bits)
```

Fig. 7

```
seq_parameter_set_rbsp( ) {                                          Descriptor
   profile_idc                                                         u(8)
   reserved_zero_8bits /* equal to 0 */                                u(8)
   level_idc                                                           u(8)
   base_seq_parameter_set_flag = 1
   temporal_dependency_flag                                            u(1)
   if( temporal_dependency_flag = = 1 ) {
      temporal_base_seq_parameter_set_id                               u(16)
      temporal_id                                                      u(3)
      base_seq_parameter_set_flag = 0
   }
   num_of_resources                                                    ue(v)
   for( i = 0; i < num_of_resources; i++ )
      resource_base_seq_parameter_set_id[ i ]                          u(16)
   if( profile_idc = = multiview_profile ) {
      multiview_dependency_flag                                        u(1)
      if( multiview_dependency_flag = = 1 ) {
         view_base_seq_parameter_set_id                                u(16)
         view_id                                                       ue(v)
         base_seq_parameter_set_flag = 0
      }
   }
   if( profile_idc = = spatial_scalability_profile ) {
      spatial_scalable_dependency_flag                                 u(1)
      if( spatial_scalable_dependency_flag = = 1 ) {
         spatial_base_seq_parameter_set_id                             u(16)
         dependency_id                                                 ue(v)
         base_seq_parameter_set_flag = 0
      }
   }
   if(base_seq_parameter_set_flag = = 1 )
      base_seq_parameter_set_rbsp( )
   rbsp_trailing_bits( )
}
```

INDICATING BIT STREAM SUBSETS

TECHNICAL FIELD

The invention relates to a method and device for indicating bit stream subsets in a compressed video bit stream, and a method and device for extracting video packets from a compressed video bit stream. The invention relates also to computer programs and computer program products.

BACKGROUND

H.264, also known as MPEG-4/Advanced Video Coding (AVC), is the state of the art video coding standard. It is a hybrid codec which takes advantage of eliminating redundancy both within each video frame and between frames. The output of the encoding process is Video Coding Layer (VCL) data which is further encapsulated into Network Abstraction Layer (NAL) units prior to transmission or storage. Apart from video data, other data that can be carried in NAL units includes parameter sets, such as Sequence Parameter Sets (SPS) and Picture Parameter Sets (PPS), which carry data that is essential for decoding of VCL data, such as video resolution or required decoder capabilities, or Supplemental Enhancement Information (SEI) that carries information that can be useful for decoders or network elements, but is not essential for decoding VCL data.

The NAL is designed in order to enable simple, effective, and flexible use of the VCL for a broad variety of systems for transport and storage of video data, such as transmission over Real-time Transport Protocol (RTP) or Hypertext Transport Protocol (HTTP), or storage in ISO file formats. The NAL unit concept is supposed to provide a means for networks, i.e., transmission and storage systems, to access, group, and manipulate, compressed bit streams by splitting the bit streams into logical units. For instance, a unit corresponding to one compressed picture is augmented with high-level information indicating to the network whether a coded picture can be used as random access point to start decoding of the compressed video.

NAL is the minimum-size functional unit for H.264/AVC video. A NAL unit can be subdivided into NAL unit header and NAL unit payload. The NAL unit header consists of a set of identifiers that can be used by networks to manage the compressed bit streams. For example, in order to reduce the transmission bit rate of a video in case of limited bandwidth, some NAL units can be discarded based on information carried in the NAL unit headers, so as to minimize the quality degradation caused by discarding video data. This process is denoted as "bit stream thinning".

While traditional video services provide video in a single representation, i.e., using fixed camera position and spatial resolution, multi-resolution and multi-view video representations have recently gained importance. A multi-resolution representation represents the video in several different spatial resolutions, so as to serve target devices with different display resolutions. A multi-view representation represents the content from different camera perspectives, a particular case being the stereoscopic video case, where the scene is captured by two cameras with a distance similar to that of the human eye. Using suitable display technologies, perception of depth can be provided to a viewer.

Multi-resolution and multi-view video representations are often referred to as hierarchical or layered representations, where a base layer represents a basic quality of the video and successive enhancement layers amend the representations towards higher qualities.

Scalable Video Coding (SVC) and Multi-view Video Coding (MVC) are video coding standards that can be used to compress multi-resolution and multi-view video representations, respectively, where high compression efficiency is achieved by eliminating redundant information between different layers. SVC and MVC are based on the AVC standard, and included as Annexes G and H in the later editions of AVC, and consequently share most of the AVC structure.

The hierarchical dependencies inherent to SVC and MVC bit streams require additional information fields in the NAL unit headers, such as decoding dependencies and view identifiers. However, in order to retain compatibility with existing AVC implementations, the basic AVC NAL unit header was not changed. Instead, the extra information, such as dependencies and view identifiers, was incorporated by introducing two new types of NAL units, namely a prefix NAL unit (type 14) and a coded slice extension NAL unit (type 20), that are defined as "unused" in AVC and thus ignored by AVC decoders which do not support Annex G or H of the specification.

A prefix NAL unit can be associated with a VCL AVC NAL unit which is supposed to follow immediately after the prefix NAL unit in the bit stream, conveying additional information pertaining to the base layer. AVC decoders will ignore the prefix NAL units and can thus decode the base layer.

A coded slice extension NAL unit is used only in SVC or MVC enhancement layers. It represents enhancement information relative to the base layer or other enhancement layers. Besides conveying dependencies and view identifiers as in the prefix NAL unit, a coded slice extension NAL unit consists both of an SVC or an MVC NAL unit header, as well as corresponding VCL data. Thus, it is a combination of a prefix NAL unit and a VCL AVC NAL unit. SVC and MVC enhancement layer NAL units will be ignored by AVC decoders.

SVC and MVC extensions of AVC are defined in a similar way. Their use is mutually exclusive, i.e., the syntax and semantics defined in the standard are partly conflicting and do not allow using SVC and MVC elements simultaneously. Combining features from SVC and MVC would require changes to the standard, and in particular to the definition of the NAL unit header.

High Efficiency Video Coding (HEVC) is a next generation video coding standard that is currently undergoing standardization. HEVC aims to substantially improve coding compared to AVC, especially for high-resolution video sequences.

In terms of high-level syntax design, the most straightforward method is to adopt the concept of AVC high-level syntax, in particular the AVC NAL unit concept. However, this may suffer from the following problems.

According to state of the art, SVC and MVC are built up from AVC in a backward compatible manner. The new NAL unit type 20 is designed with header extension that can be used for any enhancement layer. To solve legacy AVC decoder issues, the old NAL units (type 1, type 5, and other types) are kept and a prefix NAL unit association method is used for each normal AVC VCL NAL unit (type 1 and type 5). While this approach could in principle be taken for HEVC and its later extensions, it has the following problems associated with it.

—The introduction of new features or functionality requires definition of new NAL unit types, e.g., coded slice extension NAL units. This may be undesirable since the maximum number of NAL unit types is typically limited, e.g., by the defined length of the NAL unit type field.

In order to take legacy decoders into consideration, a base layer must be created with a legacy NAL unit type with a prefix NAL unit which results in a second new NAL unit type that should be designed, thus further increasing the number of NAL unit types.

The signaling of base layer and enhancement layers is not uniform and requires special treatment through the network for each layer, leading to complex implementations. The use of prefix NAL units is unnatural and provides only a weak link between the necessary header information and the corresponding VCL data. This link may easily break down if, e.g., one of the NAL units is lost in the transmissions.

In case of future extensions, nesting of prefix NAL units is complicated.

By extending the high-level interface through additional NAL unit headers, network functionalities that are supposed to process NAL units based on the information conveyed in the NAL unit headers have to be updated each time the NAL unit headers are extended.

Further problems associated with the state of the art AVC concept are related to the layered representation. Currently, in SVC and MVC, all the flags related to with layer properties, such as view_id, dependency_id, and quality_id, are simply put into NAL unit headers without any intellectual selection or categorization. This requires a client that is receiving the bit stream to have detailed knowledge about the definition of the flags, e.g., if the client wants to prune or manipulate the bit stream. Basically, the client is required to fully understand the meaning of each flag and how they interrelate. Erroneous action may easily be taken, e.g., when one view needs to be extracted from a multi-view bit stream, if the views which it depends on are not included, or a low quality version is selected if a client only considers the view_id flag. Even with some assistance from SEI elements there may be cases where it is very complex for the network to find and understand all the necessary information that is needed to extract a certain video representation from the layered bit stream.

Further, with more and more applications and standards covering 3D, new data elements, such as depth maps and occlusion maps, will be transmitted together with texture, allowing for more flexible rendering of output views at the receiving end. Since such elements form layered representations together with the (multi-view or scalable) "texture" video, it may be desirable to transmit all in the same bit stream. Such bundling of different data elements may alternatively be achieved through signaling on higher system levels, such as transport protocol or file format. However, since software and hardware implementations of such higher-level protocols are often separated from implementations of the video decompression, the exact temporal synchronization of different data elements, such as synchronization of texture with depth, may be very complex if not supported on the bit stream level. Note that the synchronization of different video data elements, such as texture and depth, must be much tighter than the synchronization of video and audio, since the different video elements must be frame aligned. Additionally, video elements, such as texture and depth may be compressed together, e.g., by re-using motion information ("motion vectors") among them, which requires tight coupling on the bit stream level.

Recently, a new design for network-friendly high-level video bit stream signaling has been introduced, aiming especially towards layered representations and compatibility with possible future codecs and applications, i.e., extensibility. The general idea is to generalize the layered bit stream concept to allow for identification of different bit stream subsets such as, e.g., a texture base view layer, a depth map high quality layer, a parameter set layer, a temporal occlusion map layer, and so forth. Each layer is associated with a stream_id, or sps_id, that identifies special properties of the particular layer. The stream_id may be associated with a specific view_id, dependency_id, or the like, and is signaled in every NAL unit header. By synthesizing all different variables into one identifier, stream_id simplifies the process of interpreting NAL units in the network and at the client side. The properties of a bit stream subset are indicated in a syntax structure called "stream description" or "stream parameter set", which is carried as a separate NAL unit in the bit stream.

On top of stream_id, the concept of video representations and representation_id is introduced, a video representation grouping several stream_id's together to form a meaningful and decodable video. The concept of video representations is the top grouping mechanism in the bit stream that is intended to instruct network and client behavior and provide highly integrated information. A meaningful video representation may, e.g., comprise all texture information in the bit stream, or texture and depth map information for a base view. A network element that wants to extract a certain video representation from the bit stream would identify the desired representation through a representation_id, and then extract all NAL units that carry one of the stream_ids associated with the representation_id. The properties of a video representation are indicated in a syntax structure called "representation description" or "representation parameter set", which is carried as a separate NAL unit in the bit stream. The stream_id's associated with a representation are signaled in a list of stream_ids in the representation parameter set.

The initial focus of the HEVC development is on mono video. However, later extensions towards scalable coding and/or multi-view coding are likely. It is also likely that a packetization concept similar to the NAL unit concept in AVC will be used. Thus, in the following, even though the presented methods are applicable primarily to future video coding standards such as HEVC, the term "NAL unit" will be used in the same sense as it is defined in AVC. Also other AVC concepts such as SPS, PPS, and SEI, are expected to be used in HEVC, and their AVC terminology is therefore used in the following, although they may be called differently in HEVC or any other future video coding standard.

SUMMARY

It is an object of the present invention to provide an improved alternative to the above techniques and prior art.

More specifically, it is an object of the present invention to provide an improved generic syntax for future video coding standards which facilitates layered video representations.

These and other objects of the invention are achieved by means of different aspects of the invention, as defined by the independent claims. Embodiments of the invention are characterized by the dependent claims.

For the purpose of describing the invention, it is assumed that a video signal is encoded into a compressed video bit stream, transmitted over a network, e.g., a local area network, a mobile phone network, or the internet, and decoded at a client, e.g., a television set, a computer, a video player, or a mobile phone. The network may comprise several network elements, such as routers and switches.

According to a first aspect of the invention, a method of indicating bit stream subsets in a compressed video bit stream is provided. The compressed video bit stream comprises a plurality of, i.e., at least two, bit stream subsets. The method comprises receiving the compressed video bit stream, dividing the compressed video bit stream into video packets, marking each video packet with a first subset identifier of a plurality of subset identifiers, and providing a first sequence parameter set (SPS) for at least some of the bitstream subsets of the plurality of bit stream subsets. Each video packet comprises either one of video data or supplemental information. Each subset identifier of the plurality of subset identifiers is associated with a corresponding bit stream subset of the plurality of bit stream subsets. The first SPS is marked with the same first subset identifier as its associated bit stream subset. The first SPS further comprises a second subset identifier of the plurality of subset identifiers. The second subset identifier indicates a decoding dependency of the bit stream subset associated with the first subset identifier on a bit stream subset associated with the second subset identifier. Optionally, the first SPS may comprise several second subset identifiers indicating decoding dependencies of the bit stream subset associated with the first subset identifier on several bit stream subsets.

According to a second aspect of the invention, a computer program is provided. The computer program comprises computer program code. The computer program code is adapted to be executed to implement the method according to the first aspect of the invention.

According to a third aspect of the invention, a computer program product is provided. The computer program product comprises a computer readable medium. The computer readable medium has the computer program according to the second aspect of the invention embodied therein.

According to a fourth aspect of the invention, a method of extracting video packets from a compressed video bit stream is provided. The compressed video bit stream is divided into video packets. The compressed video bit stream comprises a plurality of bit stream subsets. Each video packet comprises either one of video data or supplemental information. Each video packet further comprises a first subset identifier of a plurality of subset identifiers. Each subset identifier is associated with a corresponding bit stream subset of the plurality of bit stream subsets. The method comprises receiving video packets from the compressed video bit stream and extracting a first SPS from the received video packets. The first SPS is marked with the first subset identifier. The first SPS further comprises a second subset identifier of the plurality of subset identifiers. The second subset identifier indicates a decoding dependency of the bit stream subset associated with the first subset identifier on a bit stream subset associated with the second subset identifier. Optionally, the first SPS may comprise several second subset identifiers indicating decoding dependencies of the bit stream subset associated with the first subset identifier on several bit stream subsets. The method further comprises using the first subset identifier as a relevant subset identifier and using the second subset identifier as a further relevant subset identifier. The method further comprises, for each received video packet, inspecting the first subset identifier of the video packet and extracting the video packet from the compressed video bit stream. The video packet is extracted from the compressed video stream under the condition that the extracted first subset identifier matches one of the relevant subset identifiers.

According to a fifth aspect of the invention, another computer program is provided. The computer program comprises a computer program code. The computer program code is adapted to be executed to implement the method according to the fourth aspect of the invention.

According to a sixth aspect of the invention, a computer program product is provided. The computer program product comprises a computer readable medium. The computer readable medium has the computer program according to the fifth aspect of the invention embodied therein.

According to a seventh aspect of the invention, a bit stream marker for indicating bit stream subsets in a compressed video bit stream is provided. The compressed video bit stream comprises a plurality of bit stream subsets. The bit stream marker comprises a receiving unit, a packetizing unit, a marking unit, and a subset definition unit. The receiving unit is arranged for receiving the compressed video bit stream. The packetizing unit is arranged for dividing the compressed video bit stream into video packets. Each video packet comprises either one of video data or supplemental information. The marking unit is arranged for marking each video packet with a first subset identifier of a plurality of subset identifiers. Each subset identifier of the plurality of subset identifiers is associated with a corresponding bit stream subset of the plurality of bit stream subsets. The subset definition unit is arranged for providing a first SPS for at least some of the bitstream subsets of the plurality of bit stream subsets. The first SPS is marked with the same first subset identifier as its associated bit stream subset. The first SPS further comprises a second subset identifier of the plurality of subset identifiers. The second subset identifier indicates a decoding dependency of the bit stream subset associated with the first subset identifier on the bit stream subset associated with the second subset identifier. Optionally, the first SPS may comprise several second subset identifiers indicating decoding dependencies of the bit stream subset associated with the first subset identifier on several bit stream subsets.

According to an eighth aspect of the invention, a bit stream extractor for extracting video packets from a compressed video bit stream is provided. The compressed video bit stream is divided into video packets. The compressed video bit stream comprises a plurality of bit stream subsets. Each video packet comprises either one of video data or supplemental information. Each video packet further comprises a first subset identifier of a plurality of subset identifiers. Each subset identifier is associated with a corresponding bit stream subset of the plurality of bit stream subsets. The bit stream extractor comprises a receiving unit, a subset selecting unit, and an extracting unit. The receiving unit is arranged for receiving video packets from the compressed video bit stream. The subset selecting unit is arranged for extracting a first SPS from the received video packets. The first SPS is marked with the first subset identifier. The first SPS further comprises a second subset identifier of the plurality of subset identifiers. The second subset identifier indicates a decoding dependency of the bit stream subset associated with the first subset identifier on a bit stream subset associated with the second subset identifier. Optionally, the first SPS may comprise several second subset identifiers indicating decoding dependencies of the bit stream subset associated with the first subset identifier on several bit stream subsets. The subset selecting unit is further arranged for using the first subset identifier as a relevant subset identifier and for using the second subset identifier as a further relevant subset identifier. The extracting unit is arranged for, for each received video packet, inspecting the first subset identifier of the video packet and extracting the video packet from the compressed video bit stream. The video packet is extracted from the compressed video bit stream under the condition that the extracted first subset identifier matches one of the relevant subset identifiers.

The present invention makes use of an understanding that an improved network management of bit stream subsets in a compressed video bit stream may be provided by the proposed new syntax. The presented concept is simpler and allows for less complex implementation than what is known in the art. In addition to that, the presented syntax is extensible.

The proposed syntax harmonizes the concepts of subset definitions (also known as stream descriptions) and video representation definitions (also known as representation descriptions) disclosed in U.S. 61/434,146 as well as the concept of Sequence Parameter Sets (SPS) known from H.264/AVC. To this end, the SPSs known from H.264/AVC are extended to provide the features of subset definitions and video representation definitions. By providing all functionality in a common syntax structure, the system complexity is reduced. The proposed syntax structure, which may be denoted as enhanced SPS (eSPS), may be carried by one or several NAL units in the video bit stream.

An eSPS has an identifier (sps_id), the first subset identifier, which can be referred to by other NAL units in the bit stream. Association between an eSPS NAL unit and other NAL units is provided through the sps_id which represents the bit stream subset consisting of NAL units with the given sps_id.

An embodiment of the invention is advantageous in that a video decoder may first fetch available eSPSs. By simply inspecting the presented video representations, the decoder may decide which of the video representation fits its needs. Subsequently, the decoder may start decoding/downloading only NAL units which are relevant to the selected video representation, i.e., NAL units with sps_id equal to relevant subset identifiers. This provides great simplicity for bit-stream management.

Even though it has been stated that each video packet in the compressed video bit stream is marked with a subset identifier, one may also envisage embodiments of the invention which only mark a subset of all video packets comprised in the compressed video bit stream with a single subset identifier.

According to an embodiment of the invention, for each first SPS, the bit stream subset associated with the first subset identifier, the bit stream subset associated with the second subset identifier, and bit stream subsets on which the bit stream subset associated with the first subset identifier is indirectly dependent, together form an independently decodable video representation. To this end, the first SPS provides an entry point for decoding a video representation. A second subset identifier comprised in the first SPS, denoted base_sps_id, indicates a dependency towards another SPS. If an SPS does not contain any base_sps_ids, the SPS and its associated NAL units represent an independently decodable bit stream. Any base_sps_id comprised in an SPS indicates a dependency towards one or more second SPSs, also referred to as base SPSs (bSPSs). The first SPS and its associated NAL units, the second SPS and its associated NAL units, as well as potentially further SPSs as indicated through base_sps_ids in any of the involved SPSs and their associated NAL units together form an independently decodable video representation.

According to an embodiment of the invention, the first SPS further comprises information describing a video representation it represents. This may, e.g., be information pertaining to a video profile or level, information about frame sizes, i.e., number of pixels, and configurations of video coding tools which apply to the whole representation. Such information may be similar to the information provided by an SPS in accordance with the H.264/AVC standard. The information may, e.g., be used for selecting the first SPS from a plurality of SPSs according to at least one property of the video representation it represents. The at least one property may be indicated by an information element comprised in the information.

According to an embodiment of the invention, the first SPS further comprises a third subset identifier of the plurality of subset identifiers. The third subset identifier has the same value as a corresponding subset identifier of another SPS. To this end, several SPSs may have a dependency on a common bit stream subset as identified by the third subset identifier, common_sps_id. This is, e.g., advantageous in the event of independently decodable bit streams, such as texture and depth information, which both share a common resource in the bit stream. Optionally, the first SPS may comprise several third subset identifiers indicating dependencies on several common bit stream subsets.

According to an embodiment of the invention, the second subset identifier is associated with a second SPS. The first SPS selectively updates high level codec information comprised in the second SPS. For instance, an SPS may have dependencies and provide enhancement with respect to, e.g., temporal resolution by providing frame rate enhancement, spatial resolution by providing resolution enhancement, fidelity enhancement by provides higher fidelity at the same resolution, view enhancement by providing an additional video view, or the like.

According to an embodiment of the invention, the high level codec information to be updated is determined by the second subset identifier comprised in the first SPS and a type of dependency indicated by the second subset identifier.

Even though advantages of the invention have in some cases been described with reference to embodiments of the methods according to the first and the fourth aspect of the invention, corresponding reasoning applies to embodiments of the computer programs according to the second and fifth aspect of the invention, the computer program products according the third and sixth aspect of the invention, as well as the devices according to the seventh and eighth aspect of the invention.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which:

FIG. 4 illustrates SPS NAL units depending on common bit stream subsets, in accordance with an embodiment of the invention.

FIG. 5 exemplifies SPS dependencies for the case of two video views, each of them provided both in low and high resolution, respectively, in accordance with an embodiment of the invention.

FIG. 6 shows an example NAL unit header design, in accordance with an embodiment of the invention.

FIG. 7 shows an example SPS syntax, in accordance with an embodiment of the invention.

All the figures are schematic, not necessarily to scale, and generally only show parts which are necessary in order to elucidate the invention, wherein other parts may be omitted or merely suggested.

DETAILED DESCRIPTION

Figure 1:
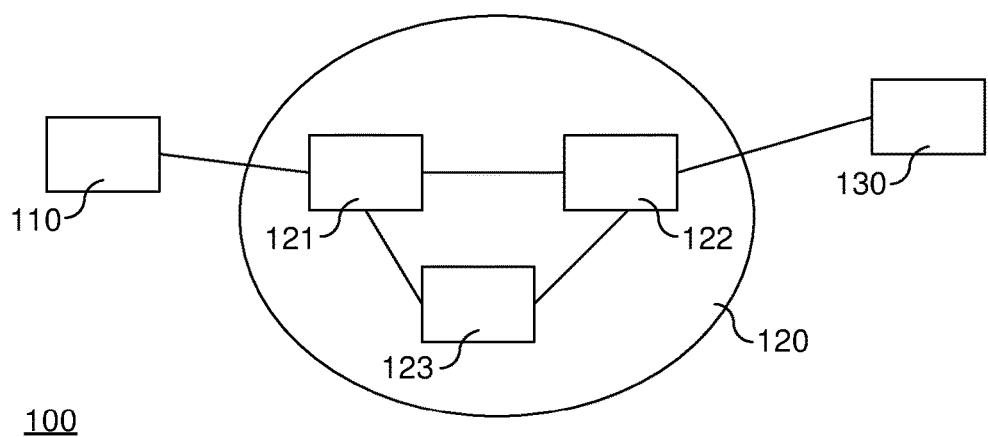
FIG. 1 shows a system for encoding, transporting, and decoding, of video signals.

For the purpose of elucidating the invention, a system 100 for encoding, transporting, and decoding, video signals is illustrated in FIG. 1.

System 100 comprises a video encoding device 110, a transport network 120, and a video decoding device 130. Typically, the video encoding device 110 receives a video signal from one or several sources and is arranged for compressing the video signal as well as sub-dividing the resulting bit stream into video packets, e.g., NAL units. The resulting video packets are then transported through transport network 120 to decoding device 130. Transport network 120 typically comprises multiple interconnected nodes, i.e., network elements, 121-123 which are arranged for transporting video packets from encoding device 110 to decoding device 130. Network elements 121-123 may, e.g., be switches, routers, or any other type of network node suitable for processing video packets. Transport network 120 may, e.g., be a local area network, a mobile phone network, or the Internet.

Decoding device 130 is arranged for receiving video packets from transport network 120 and for decoding the received compressed video bit stream. Further, decoding device 130 may be arranged for displaying the decoded video to a viewer. Decoding device 130 may, e.g., be a video player, a television set, a computer, or a mobile phone.

Figure 2:
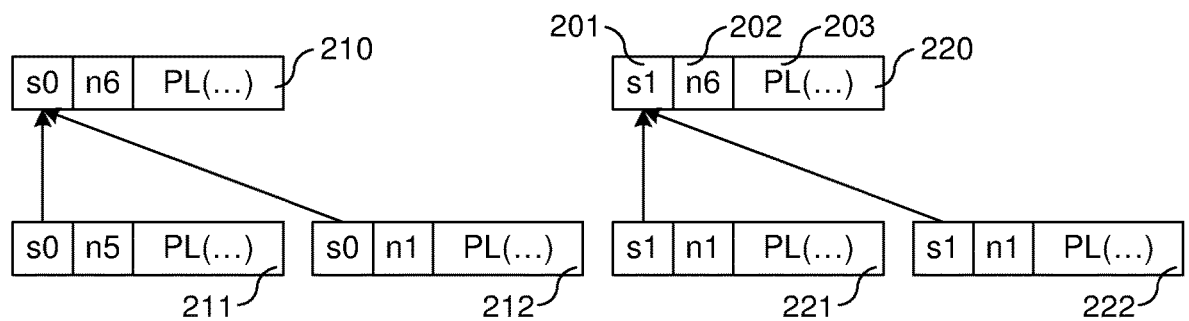
FIG. 2 illustrates associating SPS NAL units with other NAL units, in accordance with an embodiment of the invention.

With reference to FIG. 2, the association of SPS NAL units with other NAL units is illustrated.

Each NAL unit 210-212 and 220-222 comprises an sps_id field 201 for carrying the first subset identifier, a nal_unit_type field 202 for indicating the type of the NAL unit, as well as payload 203 (PL). NAL unit 210 is an eSPS, as indicated by its nal_unit_type field 202 (n6) and is marked with sps_id=s0 by means of which it is associated with NAL units 211 and 212, which carry the same sps_id. Thus, NAL units 210-212 belong to the same bit stream subset. NAL units 211 and 212 are VCL NAL units, as is indicated by their respective nal_unit_type field (n5 and n1, respectively). NAL units 210-212 all carry payload, which in the case of the eSPS NAL unit 210 comprises parameters, in particular a second subset identifier base_sps_id. VCL NAL units 211 and 212 carry video data.

Further, a second bit stream subset is illustrated in FIG. 2, comprising an eSPS NAL unit 220 and two VCL NAL units 221 and 222, each marked with a sps_id=s1. The type of each of the NAL units 220-222 is indicated by the NAL unit type, n6 for NAL unit 220 and n1 for NAL units 221 and 222, respectively.

In the following, the dependency of an eSPS, and its associated bit stream subset, on another SPS, which may be an eSPS (comprising a second subset identifier) or an SPS (in accordance with the H.264/AVC standard), is described with reference to FIG. 3.

Figure 3:
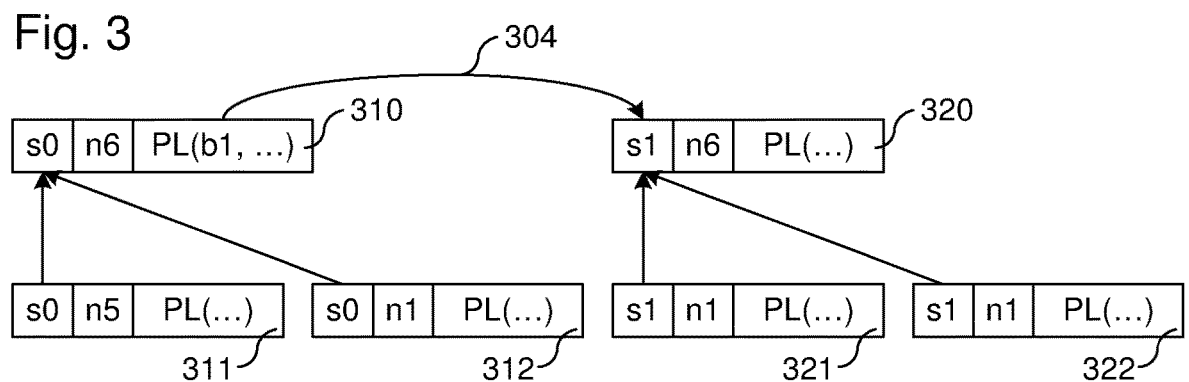
FIG. 3 illustrates a first SPS NAL unit depending on a second SPS NAL unit, in accordance with an embodiment of the invention.

NAL units 310-312 and 320-322 shown in FIG. 3 are similar to AL units 210-212 and 220-222 of FIG. 2 in that they comprise an sps_id field, an nal_unit_type field, and payload. NAL units 310 and 320 are eSPSs, whereas NAL units 311, 312, 321, and 322, are VCL NAL units. In the present example, however, a dependency 304 of eSPS NAL unit 310 on eSPS NAL unit 320 is indicated by a second subset identifier (b1), which is carried in the payload of eSPS NAL unit 310. The value of b1 is equal to s1. The dependency of eSPS NAL unit 310 on eSPS NAL unit 320 reflects a decoding dependency of the first bit stream subset, marked with sps_id=s0, on the second bit stream subset, marked with sps_id=s1.

To this end, two kinds of associations between NAL units are indicated by means of subset identifiers. Direct association between NAL units belonging to the same bit stream subset is achieved by marking each NAL unit with a common sps_id, carried in the sps_id field of the NAL unit header. Indirect association may be provided by means of further syntax elements, such as a second subset identifier, also referred to as base_sps_ids, which is carried in the payload of an eSPS NAL unit. All NAL units that carry an sps_id with the same value as base_sps_id are associated with the eSPS carrying that base_sps_id. Note that an eSPS on which another eSPS depends may in turn depend on yet another SPS, resulting in a hierarchical relationship of eSPSs and their corresponding bit stream subsets. The eSPS which is referred to by a base_sps_id is also referred to as base SPS (bSPS), and in a hierarchical relationship a bSPS may in turn be an eSPS itself in that it refers to another bSPS.

Besides the direct association by means of sps_id and the indirect association by means of base_sps_id, an eSPS NAL unit may also be directly associated with further NAL units by means of a third subset identifier, the common_sps_id. This is illustrated in FIG. 4, which illustrates two eSPS NAL units 410 and 420, as indicated by nal_unit_type=n6, and four other NAL units 431-434. eSPS NAL units 410 and 420 carry one or more common_sps_id syntax elements in their respective payload, indicating a dependency of the eSPS NAL units on other NAL units which carry an sps_id equal to one of the common_sps_ids carried by eSPS NAL units 410 and 420. For the example of FIG. 4, eSPS NAL unit 410 carries a common_sps_id c2 which has a value equal to s2, thereby indicating a dependency of the bit stream subset marked with sps_id=s0 on the bit stream subset marked with sps_id=s2. Correspondingly, eSPS NAL unit 420 carries two common_sps_ids c2 and c3, which are equal to s2 and s3, respectively. NAL unit 434 is associated with eSPS NAL unit 420 by virtue of sps_id s1.

To this end, several eSPSs may have an association with the same bit stream subset as identified by a common_sps_id. This may, e.g., be useful in the event of two video representations which are independently decodable but share a common resource, such as certain parameters.

An eSPS and its associated bSPS typically represent video sequences that are similar in certain aspects. For instance, the bSPS may represent the video at 30 Hz frame rate, whereas the eSPS represents the video at 60 Hz frame rate. This may be achieved by adding additional frames identified through the sps_id of the eSPS. The picture resolution however remains the same. Thus, instead of repeating information of the bSPS in the eSPS which is associated with that bSPS, only parts of the bSPS information are updated in the eSPS, whereas all other information is automatically deducted from the referenced bSPS. This reduces the amount of data to be sent in the eSPS, and it also eliminates the risk of inconsistencies between eSPS and its associated bSPS. This is exemplified in FIG. 5. For instance, a first eSPS 510 could represent a first video view (view 0) at a high spatial resolution (e.g., 1920×1080 pixels), whereas a second eSPS 520 could represent a second video view (view 1) at a low spatial resolution (e.g., 1280×720 pixels). Now, an eSPS 530 which depends on both bSPSs 510 and 520 could represent the second video view at the high quality (1920×1080 pixels). In that sense eSPS 530 provides a "view enhancement" relative to eSPS 510, and a "resolution enhancement" relative to eSPS 520. In terms of video coding tools, the frames carried in the NAL units that are directly associated (via sps_id) with eSPS 530 could use for instance so-called "interview prediction" with respect to the frames carried in the NAL units directly and indirectly associated with eSPS 510, and so-called "spatial inter-layer prediction" with respect to frames directly and indirectly associated with eSPS 520. By using both prediction mechanisms, redundancy towards both video representations represented by eSPS 510 and 520, respectively, could be achieved that way, thus improving compression efficiency. Note that eSPS 510 and 520 in turn can have dependencies towards other eSPSs, e.g., eSPS 540. Assuming that eSPS 540 does not have any dependencies to further eSPSs (which may or may not be the case), it may be referred to as root SPS (rSPS). In the present example, eSPS 540 could represent the first video view at low resolution (1280×720 pixels). Such an rSPS carries the same type of information that an SPS carries in accordance with the H.264/AVC standard.

As mentioned before, an eSPS may update of information (such as level, profile, configuration of coding tools) relative to a bSPS. The type of information that is updated may depend on the type of dependency that an eSPS has with respect to its bSPS. For instance, an eSPS may have dependencies and provide enhancement with respect to, e.g., temporal resolution (eSPS provides frame rate enhancement), spatial resolution (eSPS provides resolution enhancement), fidelity enhancement (eSPS provides higher fidelity but at the same resolution), view enhancement (eSPS provides an additional video view) or others, and the information (such as level, profile, coding tool configuration) may be updated as described in the following.

For temporal resolution enhancement with respect to a video representation represented by a bSPS, the eSPS could, e.g., update the video level (which indicates, e.g., the decoding complexity, such as the number of pixels to be decoded per second), and indicate the frame rate of the representation associated with the eSPS (which may be higher than that of the representation associated with the bSPS).

For spatial resolution enhancement with respect to a video representation represented by a bSPS, the eSPS could update the spatial resolution values (frame size) as well as the video profile (indicating video tools used) and video level (number of pixels to be decoded per second).

For fidelity resolution enhancement with respect to a video representation represented by a bSPS, the eSPS could update the video profile (indicating video tools used) and video level (number of pixels to be decoded per second).

For view enhancement with respect to a bSPS, the eSPS could, e.g., update the video profile (indicating video tools used) and video level (number of pixels to be decoded per second), as well as indicate an identifier for the new view (view_id). It could also indicate restrictions on which other views will be used for inter-view prediction.

The values used for subset identifiers, i.e., sps_ids, may be assigned in such a way that they express a relative priority of a respective bit stream subset. For instance, a low sps_id can express a high relative importance. In this way, a simple network element that needs to discard some NAL units, e.g., because of bit rate constraints, could discard those NAL units with higher values of sps_id while keeps NAL units with lower values of sps_id. This is advantageous in that the retained video quality can be increased, as compared to randomly discarding NAL units, without increasing the complexity in the network.

In FIG. 6, an example of the proposed syntax for a NAL unit header is illustrated. The semantics is defined as follows:

forbidden_zero_bit shall be equal to 0 nal_ref_idc indicates whether the NAL unit contains a picture that is not used for so called "inter prediction"

nal_unit_type specifies the type of RBSP data structure contained in the NAL unit sps_id indicates an association with a bit stream subset.

In FIG. 7, an example of the proposed syntax for an eSPS is illustrated, where the semantics is defined as follows:

profile_idc and level_idc indicate the video profile and video level temporal_dependency_flag indicates whether there is a temporal dependency of the representation associated with the eSPS, i.e., whether the eSPS is associated with a temporal enhancement layer. If that is the case, then temporal_base_seq_parameter_set_id indicates the sps_id of the respective temporal base layer, and temporal_id indicates the identifier of the temporal enhancement layer. The temporal_id can be thought as being associated with all NAL units that carry the same sps_id as the eSPS.

num_of_resources indicates the number of common resources that are associated with the eSPS, and resource_base_seq_parameter_set_id[i] the sps_ids of those resources.

multiview_dependency_flag indicates whether there is a multiview dependency of the representation associated with the eSPS, i.e., whether the eSPS is associated with a multiview enhancement layer (a new video view). If that is the case, then view_base_seq_parameter_set_id indicates the sps_id of the respective multiview base layer, and view_id indicates the view_id of the multiview enhancement layer.

Similarly, spatial_scalable_dependency_flag indicates whether there is a spatial dependency of the representation associated with the eSPS, i.e., whether the eSPS is associated with a spatial enhancement layer. If that is the case, then spatial_base_seq_parameter_set_id indicates the sps_id of the respective spatial base layer, and dependency_id indicates a spatial resolution identifier.

The function base_seq_parameter_set_rbsp( ) indicates signaling of codec parameters such as signaled in the seq_parameter_set_rbsp( ) in H.264/AVC.

Note that the presence of multiview_dependency_flag and spatial_scalable_dependency_flag is determined by the value of profile_idc such that multiview dependency information can only be signaled for a multiview profile and spatial dependency information can only be signaled for a spatially scalable profile. This concept makes the approach extandable in that future updates of the specification can define new values of profile_idc and corresponding types of dependency information, thereby supporting scalability.

In the following, embodiments of a method of indicating bit stream subsets in a compressed video bit stream are described with reference to FIG. 8. An embodiment of the method may, e.g., be performed in a sending device, such as encoding device 110, described with reference to FIG. 1. In particular, an embodiment of the method may be performed in a bit stream marking device, i.e., a bit stream marker, which receives a compressed video bit stream from a video encoder. To this end, an embodiment of the method may also be implemented in a video encoder. The bit stream marker subdivides the bit stream into video packets, each video packet containing compressed video data, e.g., a video frame, supplemental information, or, generally, an NAL unit. Then, each video packet is marked with a single subset identifier, using a syntax element sps_id in the NAL unit header, in accordance with an embodiment of the invention. Optionally, the video encoder may provide a packetized video bit stream to the bit stream marker, in which case the bit stream marker would not have to subdivide the bit stream into packets. Further, the marking procedure, in accordance with an embodiment of the invention, may be performed by the video encoder rather than in a separate bit stream marker.

Figure 8:
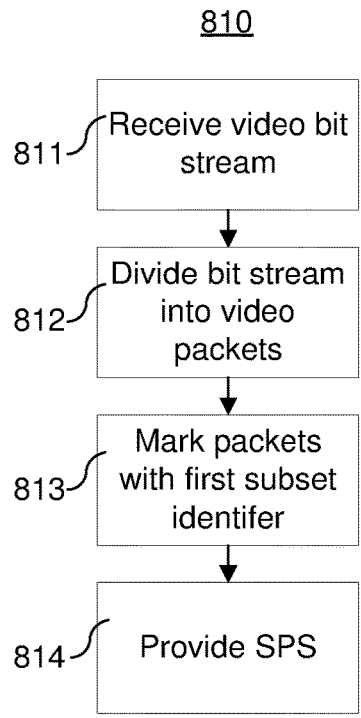
FIG. 8 shows a method of indicating bit stream subsets in a compressed video bit stream, in accordance with an embodiment of the invention.

An embodiment 810 of the method of indicating bit stream subsets in a compressed video bit stream is illustrated in FIG. 8. Method 810 comprises receiving 811 the compressed video bit stream, e.g., from a video encoder, dividing 812 the compressed video bit stream into video packets, marking 813 each video packet with a first subset identifier of a plurality of subset identifiers, wherein each subset identifier of the plurality of subset identifiers is associated with a corresponding bit stream subset of the plurality of bit stream subsets, and providing 814 a first SPS for at least some of the bitstream subsets of the plurality of bit stream subsets. Optionally, an SPS may be provided for each bit stream subset. The first SPS is marked with the same first subset identifier as its associated bit stream subset. The first SPS further comprises a second subset identifier of the plurality of subset identifiers, the second subset identifier indicating a decoding dependency of the bit stream subset associated with the first subset identifier on a bit stream subset associated with the second subset identifier. Thus, the first SPS is an eSPS. Optionally, the first SPS may comprise several second subset identifiers indicating dependencies on several bit stream subsets. The first SPS may be provided in the bit stream or separately, i.e., out-of-band.

Preferably, for each first SPS, the bit stream subset associated with the first subset identifier, the bit stream subset associated with the second subset identifier, and bit stream subsets on which the bit stream subset associated with the first subset identifier is indirectly dependent, together form an independently decodable video representation. In such case the first SPS may serve as an entry point for the determination of bit stream subsets which are required for decoding.

Optionally, the first SPS may further comprise information describing a video representation it represents. This information may, e.g., be used for selecting the first PS from a plurality of SPSs according to at least one property of the video representation it represents. The at least one property may be indicated by an information element comprised in the information, e.g., a parameter or a flag such as view_id, dependency_id, or the like.

Optionally, the first SPS may further comprise a third subset identifier (common_sps_id) of the plurality of subset identifiers, the third subset identifier having the same value as a corresponding subset identifier of another eSPS, i.e., an SPS associated with another bit stream subset and carrying the same third subset identifier.

The second subset identifier may be associated with a second SPS, and the first SPS may selectively update high level codec information comprised in the second SPS. Optionally, the high level codec information to be updated is determined by the second subset identifier comprised in the first SPS and a type of dependency indicated by the second subset identifier. The second SPS may be an eSPS or an ordinary SPS in accordance with the H.264/AVC standard.

In the following, embodiments of a method of extracting video packets from a compressed video bit stream divided into video packets are described with reference to FIG. 9. An embodiment of the method may, e.g., be performed in a receiving device, such as network elements 121-123 or decoding device 130, described with reference to FIG. 1. In particular, an embodiment of the method may be performed in a bit stream extracting device, i.e., a bit stream extractor, which receives a compressed video bit stream divided into video packets. To this end, an embodiment of the method may also be implemented in a video decoder or in a network element which is arranged for routing video packets.

Figure 9:
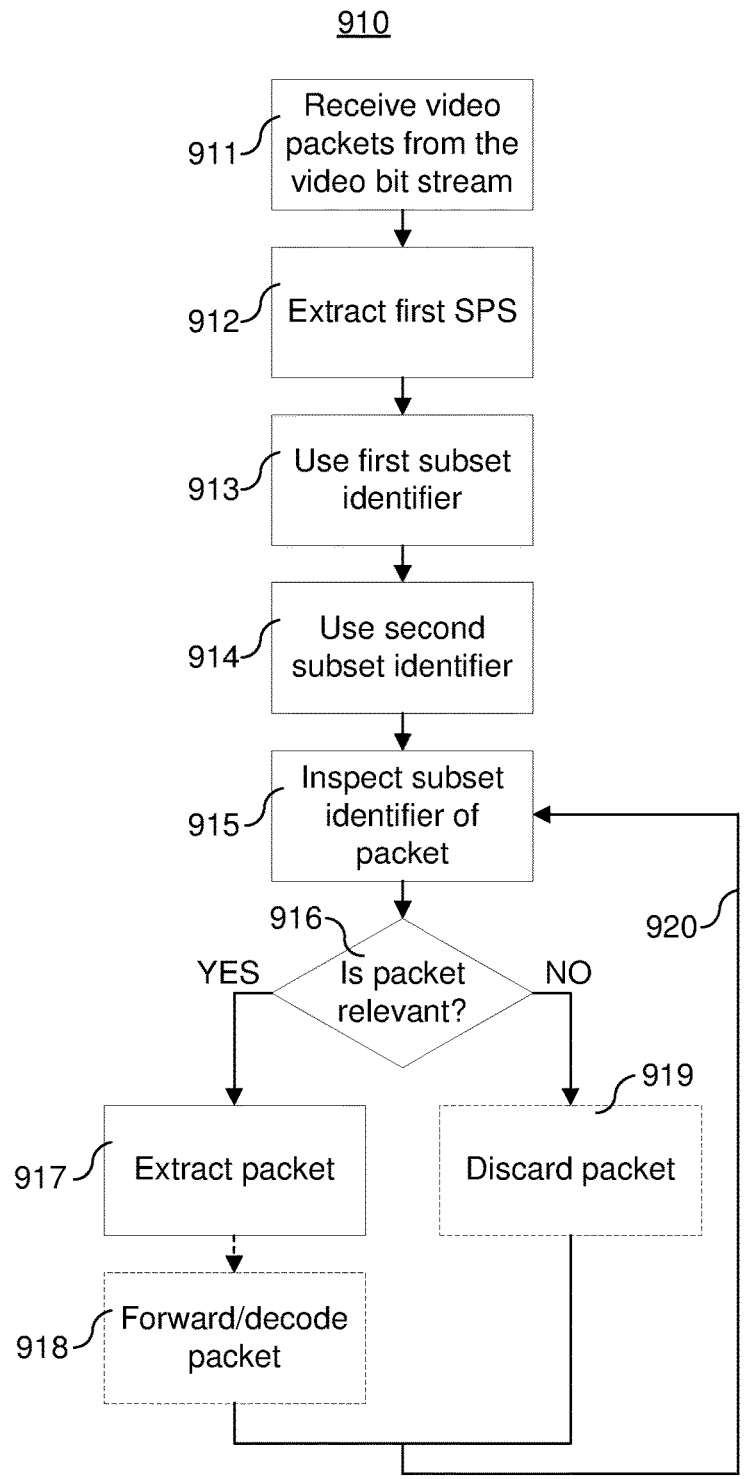
FIG. 9 shows a method of extracting video packets from a compressed video bit stream, in accordance with an embodiment of the invention.

An embodiment 910 of the method of extracting video packets from a compressed video bit stream divided into video packets is illustrated in FIG. 9. The compressed video bit stream comprises a plurality of bit stream subsets, wherein each video packet comprises either one of video data or supplemental information and a first subset identifier of a plurality of subset identifiers. Each subset identifier is associated with a corresponding bit stream subset of the plurality of bit stream subsets. Method 910 comprises receiving 911 video packets from the compressed video bit stream and extracting 912 a first SPS from the received video packets. The first SPS is marked with the first subset identifier (sps_id) and comprises a second subset identifier (base_sps_id) of the plurality of subset identifiers. The second subset identifier indicates a decoding dependency of the bit stream subset associated with the first subset identifier on a bit stream subset associated with the second subset identifier. Thus, the first SPS is an eSPS. Method 910 further comprises using 913 the first subset identifier as a relevant subset identifier, using 914 the second subset identifier as a further relevant subset identifier, and, for each received video packet, inspecting 915 the subset identifier of the video packet, and extracting 917 the video packet from the compressed video bit stream. The video packet is extracted 917 under the condition 916 that the extracted subset identifier matches one of the relevant subset identifiers.

Optionally, method 910 may further comprise forwarding or decoding 918 the extracted video packet, and discarding 919, under the condition 916 that the extracted subset identifier does not match any of the at least one relevant subset identifier, the received video packet.

Figure 10:
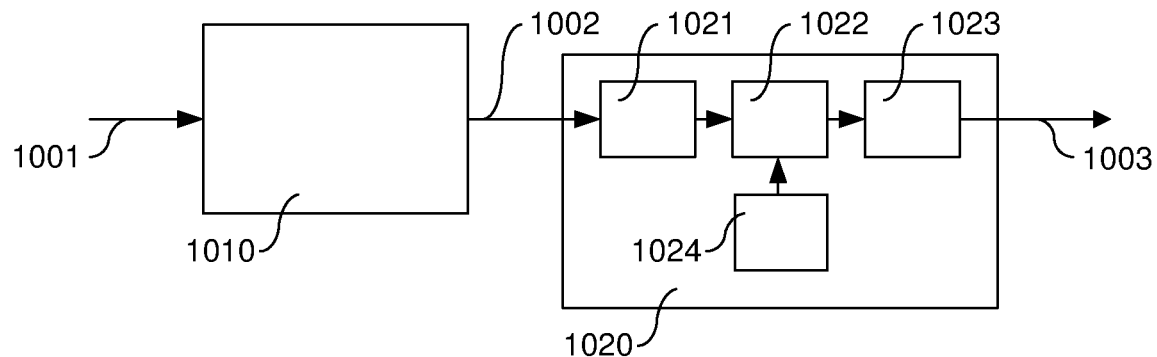
FIG. 10 shows a bit stream marker, in accordance with an embodiment of the invention.

In the following, and with reference to FIG. 10, a bit stream marker for indicating bit stream subsets in a compressed video bit stream, in accordance with an embodiment of the invention, is described. An embodiment of the bit stream marker may, e.g., be located in encoding device 110 described with reference to FIG. 1. In particular, an embodiment of the bit stream marker may be implemented in a video encoder.

Bit stream marker 1020 receives a compressed video bit stream 1002 from a video encoder 1010, which is arranged for encoding a video source signal 1001. Bit stream marker 1020 subdivides bit stream 1002 into video packets, each video packet containing compressed video data, e.g., a video frame, supplemental information, or, generally, a NAL unit. Then, each video packet is marked with a first subset identifier, using a syntax element sps_id in the NAL unit header, as was described hereinbefore. Bit stream marker 1020 transmits the packetized and marked bit stream 1003 to a transport network, such as network 120 illustrated in FIG. 1, and eventually a client or peer in a peer-to-peer network, such as decoding device 130 described with reference to FIG. 1.

To this end, bit stream marker 1020 comprises a receiving unit 1021 for receiving the compressed video bit stream, a packetizing unit 1022 for dividing the compressed video bit stream into video packets, and a marking unit 1023 for marking each video packet with a first subset identifier (sps_id) of a plurality of subset identifiers. Each subset identifier of the plurality of subset identifiers is associated with a corresponding bit stream subset of the plurality of bit stream subsets. Bit stream marker 1020 further comprises a subset definition unit 1024 being arranged for providing a first SPS for at least some of the bitstream subsets of the plurality of bit stream subsets. The first SPS is marked, by marking unit 1023, with the same first subset identifier as its associated bit stream subset. The first SPS further comprises a second subset identifier (base_sps_id) of the plurality of subset identifiers, the second subset identifier indicating a decoding dependency of the bit stream subset associated with the first subset identifier on the bit stream subset associated with the second subset identifier. Thus, the first SPS is an eSPS. Optionally, an eSPS may comprise several second subset identifiers indicating dependencies on several bit stream subsets. The first SPS may be provided in the bit stream or separately, i.e., out-of-band.

Preferably, for each first SPS, the bit stream subset associated with the first subset identifier, the bit stream subset associated with the second subset identifier, and bit stream subsets on which the bit stream subset associated with the first subset identifier is indirectly dependent, together form an independently decodable video representation. In such case the first SPS may serve as an entry point for the determination of bit stream subsets which are required for decoding.

Optionally, the first SPS may further comprise information describing a video representation it represents. This information may, e.g., be used for selecting the first SPS from a plurality of SPSs according to at least one property of the video representation it represents. The at least one property may be indicated by an information element comprised in the information, e.g., a parameter or a flag such as view_id, dependency_id, or the like.

The second subset identifier may be associated with a second SPS, and the first SPS may selectively updates high level codec information comprised in the second SPS. Optionally, the high level codec information to be updated is determined by the second subset identifier comprised in the first SPS and a type of dependency indicated by the second subset identifier.

Optionally, the first SPS may further comprise a third subset identifier (common_sps_id) of the plurality of subset identifiers, the third subset identifier having the same value as a corresponding subset identifier of another eSPS.

Receiving unit 1021, packetizing unit 1022, marking unit 1023, and subset definition unit 1024, may be implemented by means of circuitry, integrated circuits (ICs), application specific integrated circuits (ASICs), computer program modules running on one or more processors, or a combination thereof. Units 1021-1024 may be implemented as separate units or in combination.

It will be appreciated that video encoder 1010 may provide a packetized video bit stream 1002 to bit stream marker 1020, in which case bit stream marker 1020 would not have to subdivide bit stream 1002 into packets. Further, the marking procedure in accordance with an embodiment of the invention, as described hereinbefore, may be performed by video encoder 1010 rather than in a separate bit stream marker. Further, an existing video encoder may be arranged for performing bit stream marking in accordance with an embodiment of the invention by updating the software of the existing video encoder with an embodiment of the computer program.

Figure 11:
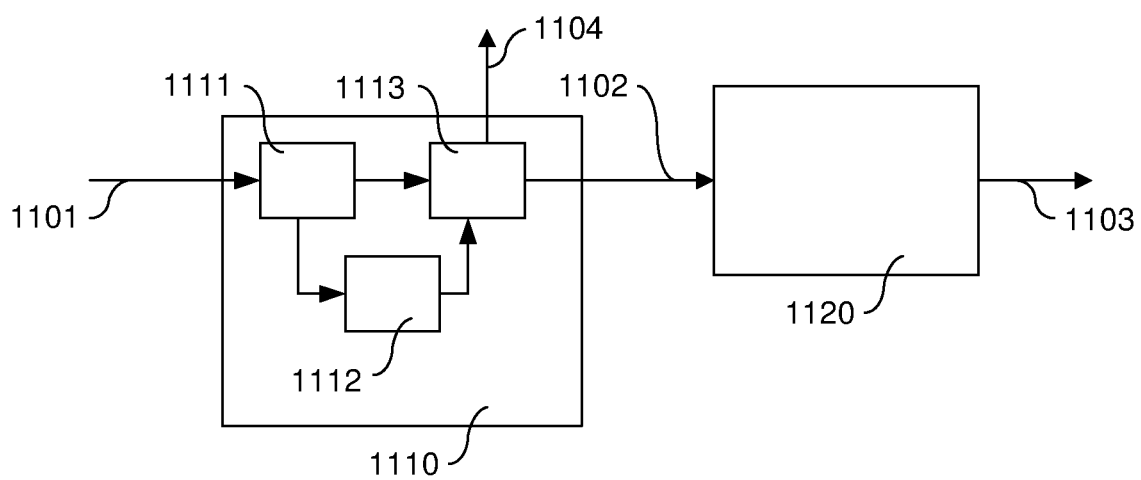
FIG. 11 shows a bit stream extractor, in accordance with an embodiment of the invention.

In the following, and with reference to FIG. 11, a bit stream extractor for extracting video packets from a compressed video bit stream is described, in accordance with an embodiment of the invention. An embodiment of the bit stream extractor may, e.g., be located in decoding device 130, or a network element 121-123, described with reference to FIG. 1. In particular, an embodiment of the bit stream extractor may be implemented in a video decoder or in a network element which is arranged for routing video packets.

Bit stream extractor 1110 receives a compressed video bit stream 1101 comprising video packets, i.e., NAL units, being associated with several bit stream subsets. Video bit stream 1101 may, e.g., be received from a transport network, such as network 120 described with reference to FIG. 1. Bit stream extractor 1110 identifies relevant NAL units comprised in bit stream 1101 and extracts them for further processing.

To this end, bit stream extractor 1110 comprises a receiving unit 1111 for receiving video packets from the compressed video bit stream 1101 and a subset selecting unit 1112 for extracting a first SPS from the received video packets, which first SPS is marked with the first subset identifier. The first SPS further comprises a second subset identifier (base_sps_id) of the plurality of subset identifiers. The second subset identifier indicates a decoding dependency of the bit stream subset associated with the first subset identifier on a bit stream subset associated with the second subset identifier. Thus, the first SPS is an eSPS. Subset selecting unit 1112 is further arranged for using the first subset identifier as a relevant subset identifier, and for using the second subset identifier as a further relevant subset identifier. Bit stream extractor 1110 further comprises an extracting unit 1113 which is arranged, for each received video packet, for inspecting the subset identifier of the video packet, and extracting 1104 the video packet from the compressed video bit stream 1101. The video packet is 1104 extracted from the compressed video bit stream 1101 under the condition that the extracted subset identifier matches one of the relevant subset identifiers.

Optionally, extracting unit 1113 may further be arranged, for each received video packet, for forwarding or decoding the extracted video packet, and discarding 1104 the video packet. The received video packet is discarded 1104 under the condition that the extracted subset identifier does not match any of the at least one relevant subset identifier. If the video packet is forwarded it may, e.g., be transmitted 1102 to a video decoder 1120, which decodes the video signal and outputs the decoded video signal 1103 for further processing, such as displaying to a viewer.

Receiving unit 1111, subset selecting unit 1112, and extracting unit 1113, may be implemented by means of circuitry, ICs, ASICs, computer program modules running on one or more processors, or a combination thereof. Units 1111-1113 may be implemented as separate units or in combination.

It will be appreciated that the procedure of extracting bit stream subsets, i.e., video packets, from video bit stream may be performed by video decoder 1120 rather than a separate bit stream extractor. Further, an existing video decoder may be arranged for performing bit stream extraction in accordance with an embodiment of the invention by updating the software of the existing video decoder with an embodiment of the computer program.

Figure 12:
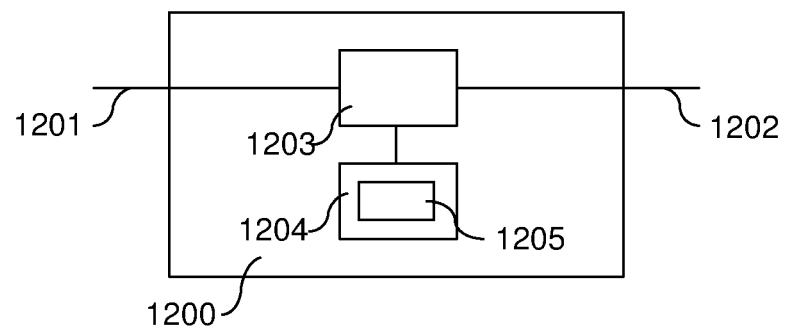
FIG. 12 shows a video processing device for executing computer program code, in accordance with embodiments of the invention.

With reference to FIG. 12, a computer program and a computer program product, in accordance with embodiments of the invention, are illustrated.

FIG. 12 shows a video processing device 1200 for processing a video bit stream 1201 and outputting a processed video bit stream 1202. Video processing device 1200 comprises a processor 1203 and a storage medium 1204. Storage medium 1204 may be a computer program product comprising a computer program 1205. Alternatively, computer program 1205 may be transferred to storage medium 1204 by means of a suitable computer program product, such as a floppy disk or a memory stick. As a further alternative, computer program 1205 may be downloaded to storage medium 1204 over a network. Processor 1203 is arranged for loading computer program 1205 from storage medium 1204 and executing computer program code comprised in computer program 1205 so as to implement an embodiment of the method in accordance with the first or the fourth aspect of the invention. For instance, processor 1203 may be adapted, when executing computer program 1205, to implement an embodiment of the method of indicating bit stream subsets in a compressed video bit stream. Alternatively, processor 1203 may be adapted, when executing computer program 1205, to implement an embodiment of the method of extracting video packets from a compressed video bit stream. Processor 1203 may be a general purpose processor, a video processor, or any other type of circuitry being arranged for, when executing computer program 1204, implementing an embodiment of the method in accordance with the first or the fourth aspect of the invention. Processing device 1200 may, e.g., be comprised in a mobile phone, a tablet, a user equipment (UE), a personal computer, a video player/recorder, a multimedia player, a media streaming server, a set-top box, a television set, or any other type of device having computing capabilities.

Further, all embodiments of the invention described hereinbefore may be implemented in a video encoder or decoder, either in software, hardware, or a combination thereof. The encoder and/or decoder may also be implemented in a network device being, or belonging to, a network node in a communications network between a sending device and a receiving device. Such a network device may be a device for converting video according to one video coding standard to another video coding standard, for example if it has been established that the receiving device is only capable, or prefers, another video coding standard than the one sent from the sending device. Although the video encoder and/or decoder disclosed above have been disclosed physically separate devices, and may be comprised in special purpose circuits such as one or more ASICs, the invention covers embodiments of devices where some parts of the encoder and/or decoder are implemented as computer program modules running on one or more general purpose processors.

The person skilled in the art realizes that the present invention by no means is limited to the embodiments described above. On the contrary, many modifications and variations are possible within the scope of the appended claims. For example, the present invention is not limited to video coding but may be applied to all types of media, such as audio, subtitles, graphics, and the like.

The invention claimed is:

1. A method of indicating decoding dependencies for a compressed video bit stream, the method comprising:
    receiving the compressed video bit stream, wherein the compressed video bit stream comprises a plurality of bit stream subsets in which one or more bit stream subsets in the plurality are dependent bit stream subsets having decoding dependencies on one or more other bit stream subsets in the plurality, said one or more other bit stream subsets referred to as related bit stream subsets;
    dividing the compressed video bit stream into video packets, each video packet belonging to a respective one of the bit stream subsets;
    marking each video packet according to the respective bit stream subset to which the video packet belongs, by including a subset identifier in a header portion of the video packet;
    transmitting or storing the marked video packets for decoding; and
    providing one or more Sequence Parameter Set (SPS) packets among the marked video packets, to indicate the decoding dependencies of the dependent bit stream subsets, including forming each such provided SPS packet by:
        including in a header portion of the provided SPS packet, a subset identifier of a dependent bit stream subset; and
        including in a payload portion of the provided SPS packet, subset identifiers of the related bit stream subsets, and a reduced SPS comprising only those parameters that are updated for decoding of the dependent bit stream subset in comparison to the SPSs associated with the related bit stream subsets.

2. A method of determining decoding dependencies for a compressed video bit stream, the method comprising:
    receiving marked video packets representing the compressed video bit stream, wherein the compressed video bit stream comprises a plurality of bit stream subsets in which one or more bit stream subsets in the plurality are dependent bit stream subsets have decoding dependencies on one or more other bit stream subsets in the plurality, said one or more other bit stream subsets referred to as related bit stream subsets, wherein each marked video packet is marked with a subset identifier of the bit stream subset to which the marked video packet belongs, and wherein certain ones of the marked video packets are Sequence Parameter Set (SPS) packets for the dependent bit stream subsets; and for a given dependent bit stream subset:
identifying an SPS packet corresponding to the given dependent bit stream subset based on determining that a header portion of the SPS packet carries the subset identifier of the given dependent bit stream subset;
identifying the one or more related bit stream subsets based on reading corresponding subset identifiers from a payload portion of the SPS packet;
determining an SPS to use for decoding the given dependent bit stream subset based on SPSs corresponding to the one or more related bit stream subsets, as updated by any parameters included in the payload portion of the SPS packet; and
extracting an independently decodable video representation from the marked video packets, based on extracting all marked video packets that are marked with any of the subset identifiers corresponding to the given dependent bit stream subset and the one or more related bit stream subsets.

3. An apparatus configured to indicate decoding dependencies for a compressed video bit stream, the apparatus comprising:
receiving circuitry configured to receive the compressed video bit stream, wherein the compressed video bit stream comprises a plurality of bit stream subsets in which one or more bit stream subsets in the plurality are dependent bit stream subsets having decoding dependencies on one or more other bit stream subsets in the plurality, said one or more other bit stream subsets referred to as related bit stream subsets;
processing circuitry configured to:
divide the compressed video bit stream into video packets, each video packet belonging to a respective one of the bit stream subsets; and
mark each video packet according to the respective bit stream subset to which the video packet belongs, by including a subset identifier in a header portion of the packet;
output circuitry configured to transmit or store the marked video packets for decoding; and
wherein the processing circuitry is further configured to provide one or more Sequence Parameter Set (SPS) packets among the marked video packets, to indicate the decoding dependencies of the dependent bit stream subsets, including forming each such provided SPS packet by:
including in a header portion of each provided SPS packet, a subset identifier of a dependent bit stream subset; and
including in a payload portion of each provided SPS packet, the subset identifiers of the related bit stream subsets, and a reduced SPS comprising only those parameters that are updated for decoding of the dependent bit stream subset in comparison to the SPSs associated with the related bit stream subsets.

4. An apparatus configured to determine decoding dependencies for a compressed video bit stream, the apparatus comprising:
receiving circuitry configured to receive marked video packets representing the compressed video bit stream, wherein the compressed video bit stream comprises a plurality of bit stream subsets in which one or more bit stream subsets in the plurality are dependent bit stream subsets having decoding dependencies on one or more other bit stream subsets in the plurality, said one or more other bit stream subsets referred to as related bit stream subsets, and wherein each marked video packet is marked with a subset identifier of the bit stream subset to which the marked video packet belongs, and wherein certain ones of the marked video packets are Sequence Parameter Set (SPS) packet for the dependent bit stream subsets; and
processing circuitry configured to, for a given dependent bit stream subset:
identify an SPS packet corresponding to the given dependent bit stream subset based on determining that a header portion of the SPS packet carries the subset identifier of the given dependent bit stream subset;
identify the one or more related bit stream subsets based on reading corresponding subset identifiers from a payload portion of the SPS packet;
determine an SPS to use for decoding the given dependent bit stream subset based on SPSs corresponding to the one or more related bit stream subsets, as updated by any parameters included in the payload portion of the SPS packet; and
extract an independently decodable video representation from the marked video packets, based on extracting all marked video packets that are marked with any of the subset identifiers corresponding to the given dependent bit stream subset and the one or more related bit stream subsets.

\* \* \* \* \*

UNITED STATES PATENT AND TRADEMARK OFFICE
CERTIFICATE OF CORRECTION

Page 1 of 3

PATENT NO. : 10,944,994 B2
APPLICATION NO. : 14/129156
DATED : March 9, 2021
INVENTOR(S) : Rusert et al.

It is certified that error appears in the above-identified patent and that said Letters Patent is hereby corrected as shown below:

In the Drawings

In Fig. 6, Sheet 2 of 5, delete "
```
forbidden_zero_bit (1 bit)
nal_ref_idc (2 bits)
nal_type (5 bits)
sps_id (16 bits)
```
" and insert --
```
forbidden_zero_bit (1 bit)
nal_ref_idc (2 bits)
nal_unit_type (5 bits)
sps_id (16 bits)
```
--, therefor.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,944,994 B2

In Fig. 9, Sheet 4 of 5, delete " 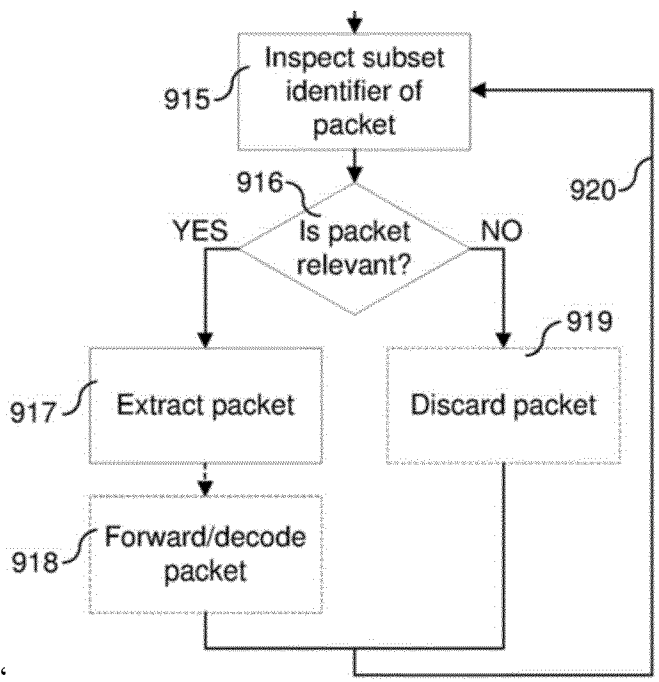 " and insert

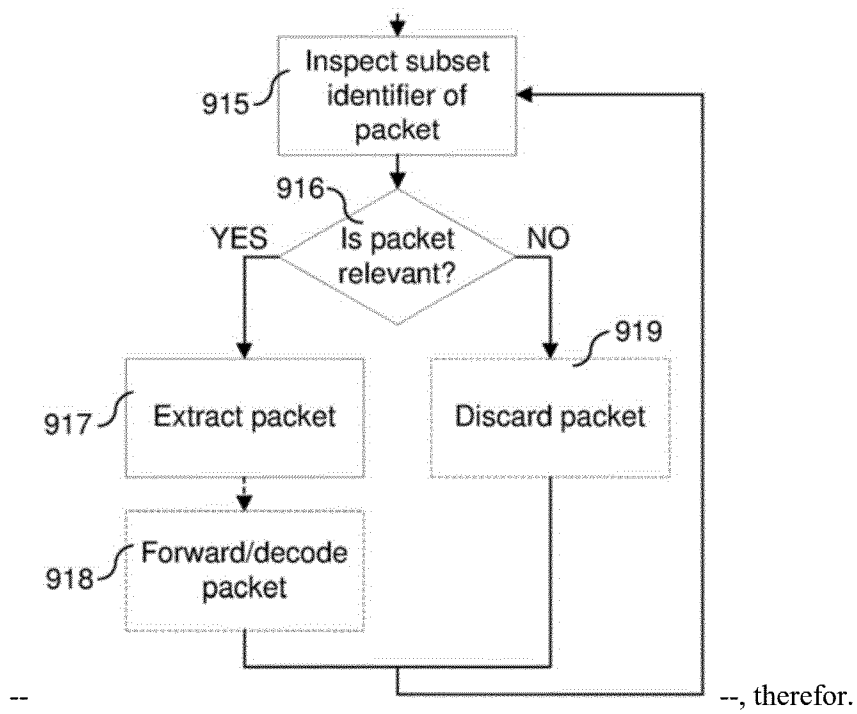

-- --, therefor.

In the Specification

In Column 2, Line 65, delete "—The" and insert -- The --, therefor.

In Column 4, Line 21, delete "stream_id's" and insert -- stream_ids --, therefor.

In Column 4, Line 36, delete "stream_id's" and insert -- stream_ids --, therefor.

CERTIFICATE OF CORRECTION (continued)
U.S. Pat. No. 10,944,994 B2

In Column 8, Line 48, delete "according the" and insert -- according to the --, therefor.

In Column 10, Line 24, delete "AL units" and insert -- NAL units --, therefor.

In Column 11, Line 53, delete "update of information" and insert -- update information --, therefor.